(12) United States Patent
Myers et al.

(10) Patent No.: US 6,616,906 B2
(45) Date of Patent: Sep. 9, 2003

(54) METHOD FOR MAKING POLYPHOSPHORIC ACID

(75) Inventors: Dennis L. Myers, Newtown, PA (US); Robert W. Hudson, Landenberg, PA (US); Nathan P. Mills, Baltimore, MD (US); David Michael Razmus, West Windsor, NJ (US); Vincent Payen, Monmouth Junction, NJ (US)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 10/105,573

(22) Filed: Mar. 25, 2002

(65) Prior Publication Data

US 2003/0035768 A1 Feb. 20, 2003

Related U.S. Application Data

(60) Provisional application No. 60/311,061, filed on Aug. 9, 2001.

(51) Int. Cl.$^7$ ................................................ C01B 25/24
(52) U.S. Cl. ...................................................... 423/316
(58) Field of Search ................................ 423/304, 316, 423/317

(56) References Cited

U.S. PATENT DOCUMENTS

| 3,044,851 | A | 7/1962 | Young |
| 3,656,897 | A | 4/1972 | White et al. .................. 23/165 |
| 4,309,394 | A | 1/1982 | Hudson ....................... 423/317 |
| 4,379,131 | A | 4/1983 | Daniel et al. ................ 423/304 |
| 4,988,489 | A | 1/1991 | Todd et al. .............. 423/321 R |

Primary Examiner—Wayne A. Langel

(57) ABSTRACT

An improved method for making polyphosphoric acid from phosphoric acid includes the steps of introducing a first phosphoric acid feed stream into the top end of a packed column, introducing a second phosphoric acid feed stream into a stream of hot air to form a stream of hot air and acid, introducing the stream of hot air and acid into the bottom end of the column, and polymerizing phosphoric acid of the first and second phosphoric acid feed streams to make polyphosphoric acid. By-product phosphoric acids containing organic contaminants may be substituted for all or part of the phosphoric acid stream being introduced into the bottom end of the column to allow recovery of the phosphorus values of the by-product phosphoric acids.

19 Claims, 1 Drawing Sheet

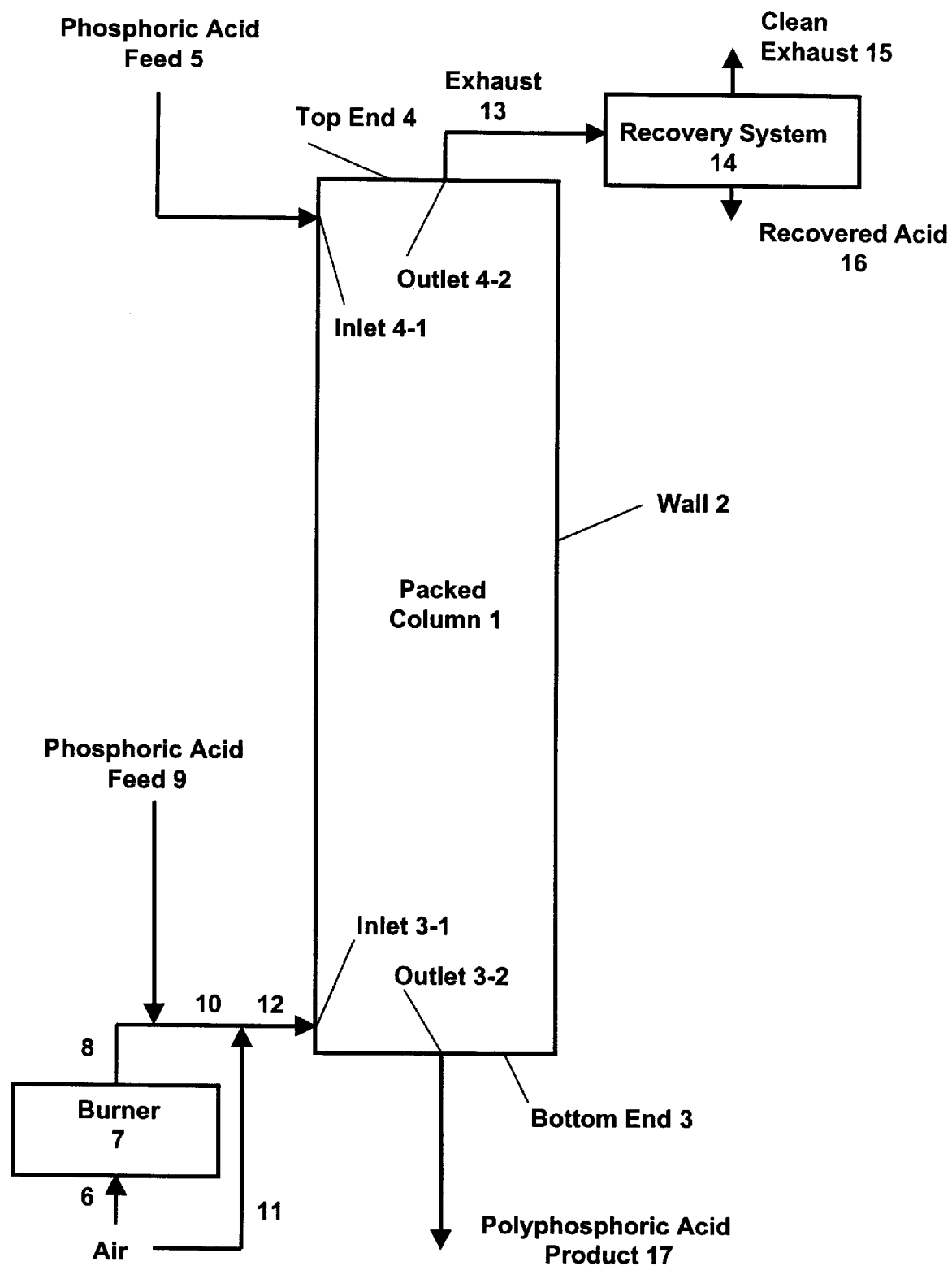

METHOD FOR MAKING POLYPHOSPHORIC ACID

This application claims the benefit of provisional application Ser. No. 60/311,061 file Aug. 9, 2001.

FIELD OF THE INVENTION

This invention relates to a method for making polyphosphoric acid.

BACKGROUND OF THE INVENTION

Polyphosphoric acid is a phosphoric acid oligomer comprising molecules according to one or more of structural formulae (1) and (2):

$$P_nO_{3n+1}^{(n+2)-} \quad (1)$$

wherein n is a number greater than 1, $$P_2O_5 \cdot x(O^{2-}) \quad (2)$$

wherein 0<x<1, and typically having an average molecular weight of from about 110 to about 1,500 atomic weight units.

Polyphosphoric acid is made by dehydrating and polymerizing technical or food grade phosphoric acid, for example, in a packed column or by absorbing $P_2O_5$ vapors in a recirculating phosphoric acid stream.

Polyphosphoric acid is used in many diverse applications, including the manufacture of petroleum catalysts, surfactants for hand lotions and shampoos, oil well drilling compounds, industrial water treatment chemicals, flame retardant resins, super fibers and pigments, such as quinacridone pigments, and as a performance enhancing additive to petroleum products.

Some industrial uses of polyphosphoric acid generate by-product phosphoric acids that contain contaminants, such as phosphate esters, other organic compounds and metals. By-product phosphoric acids can also be generated by other industrial processes, such as, for example, processes for manufacturing polycarbonate resins, synthetic fibers, pharmaceutical intermediates and agricultural chemicals, as well as other industrial processes that use phosphorus containing materials. These by-product phosphoric acids can be neutralized and disposed of as a waste stream. Alternatively, such by-product phosphoric acids may be consumed by oxidizing the by-product acids in a thermal phosphoric acid production process, that is, production of phosphoric acids by combustion of elemental phosphorus in excess air, to thereby recover the phosphorus values from the by-product acids as phosphoric acid and to convert the organic contaminants to water and $CO_2$.

The thermal phosphoric acid process is very costly due to the use of elemental phosphorus as its raw material and energy source. The production of polyphosphoric acid from thermal process phosphoric acid is correspondingly expensive, due to the high cost of the thermal process phosphoric acid raw material.

There is an interest in less costly ways to make polyphosphoric acid and to recover phosphorus values from by product phosphoric acid.

SUMMARY OF THE INVENTION

In a first aspect, the present invention is directed to a method for making polyphosphoric acid from phosphoric acid, comprising:

(a) providing a packed column, said packed column extending from a bottom end to a top end and having one or more first inlet openings located at or near the top end of the column and one or more second inlet openings located below the first inlet openings, (b) introducing a first acid feed stream, said first acid stream comprising phosphoric acid, into the column at one or more of the first inlet openings;

(c) introducing a second acid feed stream, said second acid feed stream comprising phosphoric acid, into a stream of hot air to form a stream of hot air and acid;

(d) introducing the stream of hot air and acid into the column at one or more of the second inlet openings; and (e) polymerizing phosphoric acid of the first and second acid feed streams to make polyphosphoric acid.

Introduction of the second acid stream into hot air stream allows dehydration and polymerization of the phosphoric acid into polyphosphoric acid to begin before the stream enters the column. The capacity of a packed column is limited by potential "flooding" of the column. Flooding is a condition in which the gravity head of liquid in the column balances the gas pressure drop across the column and liquid can no longer flow through the packing at the desired feed rate. During operation of the column, the rate at which liquid feed streams are introduced to the column must be less than the rate that would cause flooding of the column. Compared to operation of a given packed column with a single acid feed stream fed into the top of the column, operation of the column according to the process of the present invention provides an increase in the capacity of the column. It is believed that the higher capacity is achieved, at least in part, because the process of the present invention allows more efficient use of the bottom section of the column and thereby allows, in total, a higher liquid feed rate to be maintained without flooding of the column.

In a second aspect, the present invention is directed to a method for consuming by-product phosphoric acid and reclaiming phosphorus values from the by-product phosphoric acid, said by-product phosphoric acid comprising phosphoric acid and one or more organic contaminants and said method comprising:

(a) providing a packed column, said packed column extending from a bottom end to a top end and having one or more first inlet openings located at or near the top end of the column and one or more second inlet openings located below the first inlet openings;

(b) introducing a first acid feed stream, said first acid feed stream comprising phosphoric acid, into the column at one or more of the first inlet openings;

(c) introducing a second acid feed stream, said second acid feed stream comprising by-product phosphoric acid, into a stream of hot air to form a stream of hot air and acid;

(d) introducing the stream of hot air and acid into the column at one or more of the second inlet openings; and (e) polymerizing phosphoric acid of the first and second feed streams to make polyphosphoric acid, while simultaneously decomposing the one or more organic contaminants.

Consuming by-product acids according to the method of the present invention recovers the phosphorus value of the by-product acids by converting them to polyphosphoric acid, decomposes the organic contaminants, increases the production capacity of the polyphosphoric acid column and is much less costly than recycling the by-product acids in a thermal phosphoric acid production process, since natural gas is used as the energy source, rather than elemental phosphorus.

BRIEF DESCRIPTION OF THE DRAWINGS

The FIGURE shows a schematic diagram of an embodiment of the process of the present invention.

DETAILED DESCRIPTION OF INVENTION AND PREFERRED EMBODIMENTS

As used herein, the term "polymer" is used in a broad sense meaning a molecule made of two or more repeating units and includes, for example, oligomers, and terms derived from the term "polymer", such as "polymerize" are also used in a broad sense and include for example, oligomerization.

Referring to the FIGURE, the method of the present invention is conducted in a packed column 1.

The packed column 1 comprises a substantially continuous tubular wall 2, which extends longitudinally upwardly from a bottom end 3 to a top end 4. In a preferred embodiment, tubular wall 2 is a right circular cylindrical tubular wall that extends vertically along its longitudinal axis. The wall 2 and ends 3, 4 define an internal volume within the packed column.

The tubular wall 2 and ends 3, 4 of packed column 1 may be constructed of any material suitable for hot phosphoric acid service, such as, for example, metal, carbon, graphite, ceramic, composite material or a combination thereof.

In a preferred embodiment, the bottom end 3 of packed column 1 is equipped with one or more inlet openings 3-1 to allow introduction of a gas stream into the packed column 1 and an outlet opening 3-2 to allow removal of a liquid stream from the packed column 1.

In a more highly preferred embodiment, one or more inlet openings 3-1 are provided through bottom end 3 of packed column 1 or near bottom end 3 of packed column 1, that is, through tubular wall 2 at a location within a distance of one half, more preferably one quarter, of the height of packed column 1 from bottom end 3 of packed column 1, to allow introduction of a material stream into packed column 1 at a location at or near the bottom end 3 of packed column 1.

In a more highly preferred embodiment, one or more outlet openings 3-2 are provided through bottom end 3 of packed column 1 or near bottom end 3 of packed column 1, that is, through tubular wall 2 at a location within a distance of one half, more preferably one quarter, of the height of packed column 1 from bottom end 3 of packed column 1, to allow removal of a material stream from packed column 1 at a location at or near the bottom end 3 of packed column 1.

In a preferred embodiment, the top end 4 is equipped with one or more inlet openings 4-1 to allow introduction of a liquid stream into the packed column 1 and an outlet opening 4-2 to allow a gas stream to exit the packed column 1.

In a more highly preferred embodiment, one or more inlet openings 4-1 are provided through top end 4 of packed column 1 or near top end 4 of packed column 1, that is, through tubular wall 2 at a location within a distance of one half, more preferably one quarter, of the height of packed column 1 from top end 4 of packed column 1, to allow introduction of a material stream into packed column 1 at a location at or near the top end 4 of packed column 1.

In a more highly preferred embodiment, one or more outlet openings 4-2 are provided through top end 4 of packed column 1 or near top end 4 of packed column 1, that is, through tubular wall 2 at a location within a distance of one half, more preferably one quarter, of the height of packed column 1 from top end 4 of packed column 1, to allow removal of a material stream from packed column 1 at a location at or near the top end 4 of packed column 1.

In a preferred embodiment, the packed column 1 has an internal cross sectional area, taken perpendicular to the length of, that is, perpendicular to the longitudinal axis of, the column 1, of from about 3 to about 20 square feet ($ft^2$) cross sectional area per gallon per minute (gpm) of acid stream 5.

The packed column 1 further comprises a packing disposed within the internal volume of the packed column 1. The packing may be made of any material suitable for hot phosphoric acid service, such as, for example, metal, carbon, graphite, ceramic, composite material or a combination thereof, and may be any convenient size and shape conventionally used as packing material in gas-liquid contacting equipment, including, for example, Raschig rings, saddles, other known column packing material configurations or mixtures thereof.

A phosphoric acid feed stream 5 is introduced into the packed column 1 at or near the top end 4 of the packed column 1 through the one or more inlet openings 4-1. In a preferred embodiment, the feed stream 5 is an aqueous phosphoric acid solution comprising from about 50 to about 90 percent by weight (wt %), more preferably from about 70 to about 87 wt %, phosphoric acid.

An air stream 6 is heated in a burner 7 to form a hot air stream 8. In a preferred embodiment, the flow rate of hot air stream 8 is from about 200 to about 1,200 cubic feet ($ft^3$) per gallon of acid feed stream 5. In a preferred embodiment, the hot air stream 8 exhibits a temperature of from about 800° C. to about 1200° C., more preferably from about 900° C. to about 1000° C.

A phosphoric acid feed stream 9 is introduced into the hot air stream 8 to form a hot acid stream 10 comprising hot air and entrained acid.

In a preferred embodiment, the phosphoric acid feed stream 9 comprises an aqueous phosphoric acid solution comprising from about 50 to about 90 wt %, more preferably from about 70 to about 87 wt %, phosphoric acid. All or part of the phosphoric acid content of acid feed stream 9 may be derived from by-product phosphoric acid or acids and the acid feed stream 9 may further comprise minor amounts of organic contaminants and metal contaminants that may be associated with such by-product acid or acids.

In a preferred embodiment, the flow rate of the phosphoric acid stream 9 is from about 10 to about 50% of the flow rate of phosphoric acid stream 5.

The introduction of by-product acid or acids in acid stream 9 provides sufficient contact time within the column to allow decomposition or charring of any organic contaminants, such as, for example, phosphate esters, contained in the by-product acid. It is preferred that by-product acid or acids not be introduced into the column via acid feed stream 5, because introduction into the top end 4 of the column 1 may not provide sufficient contact time within the column to allow decomposition or charring of any organic contaminants contained in the by-product acid or acids.

In a highly preferred embodiment, the acid stream 9 comprises by-product phosphoric acid generated in the manufacture of quinacridone pigment. In general, the quinacridone pigment is made by contacting a quinacridone precursor with polyphosphoric acid. The polyphosphoric acid performs a ring-closing function by removing water from the quinacridone precursor. The reaction produces quinacridone and converts the polyphosphoric acid to phosphoric acid. The raw quinacridone pigment is quenched in methanol, which acts as a crystal habitat modifier that controls the color of the final pigment product. The quinacridone pigment crystals are then filtered out as the quinacridone pigment product. The filtrate is separated into a methanol and water stream, which is recycled and an aqueous by-product acid stream. The by-product acid contains approximately 75% phosphoric acid and contains organic contaminants, including alkyl phosphate esters, such as mono-, di- and tri-methyl phosphate esters, aniline, 4-chloroaniline, o-toluidine, p-toluidine, and methanol.

A stream 11 of ambient temperature air is combined with the hot acid stream 10 to adjust the temperature of the hot acid stream 10 and form a hot acid feed stream 12. Hot acid feed stream 12 comprises hot air and entrained acid. In a preferred embodiment, the flow rate of ambient temperature air stream 11 relative to that of hot acid stream 10 is effective to provide a hot acid feed stream 12 that exhibits a temperature of from about 450° C. to about 750° C., more preferably from about 550° C. to about 650°, still more preferably from about 590° C. to about 630° C. Hot acid feed stream 12 is introduced into the column 1 at or near the bottom end 3 of the column 1 through the one or more inlet openings 3-1.

Energy from the hot acid feed stream 12 heats the packed column 1 and the materials introduced in the feed streams 5 and 12. Contact of the phosphoric acid introduced in acid feed streams 5 and 12 with the heated packed column 1 and heated air of hot acid feed stream 12 drives dehydration and polymerization of the phosphoric acid to yield polyphosphoric acid. The relative flow rates and temperatures of the phosphoric acid streams 5, 9, hot air stream 10 and ambient air stream are effective to maintain phosphoric acid polymerization conditions, that is, a temperature above about 300° C., more preferably above about 425° C., in the column.

Water in the packed column 1 vaporizes and, along with some ortho-phosphoric acid, forms an acid mist that moves upward through the packed column 1. Organic contaminants, if any, introduced with by-product acid in acid stream 9 are broken down and charred by exposure to the elevated temperatures in the hot acid stream 10, hot acid feed stream 12 and the packed column 1. For example, phosphate esters, if present, are decomposed into phosphoric acid and methanol and methanol from the by-product acid and from phosphate ester decomposition is decomposed into carbon dioxide and water. Metal contaminants, if any, remain dissolved in the polyphosphoric acid. In general, gaseous decomposition products move upward through the packed column 1 and exit in exhaust stream 13 and any remaining charred organic contaminants and metal contaminants move downward through the packed column 1 with the polyphosphoric acid and exit the column with the polyphosphoric acid stream 17.

An exhaust stream 13 containing air, carbon dioxide and an aqueous phosphoric acid mist exits from the packed column 1 at or near top end 4 of the packed column 1 through the one or more outlet openings 4-2 and is directed to pollution control and recovery system 14. In a preferred embodiment, the pollution control and recovery system 14 is a packed candle type mist eliminator. The pollution control and recovery system 14 recovers phosphoric acid from exhaust stream 13.

A clean exhaust stream 15 of gaseous residuals, comprising carbon dioxide, water and air, is emitted from recovery system 14.

A stream 16 of recovered phosphoric acid exits pollution control and recovery system 14. In a preferred embodiment, the recovered phosphoric acid is an aqueous phosphoric acid solution comprising from about 0.5 to about 77 wt %, more typically, from about 60 to about 75 wt %, phosphoric acid.

A polyphosphoric acid stream 17 is removed from the packed column 1 at or near the bottom end 3 of the packed column 1 through the one or more outlet openings 3-2. In a preferred embodiment, the polyphosphoric acid has an acid content, expressed on the basis of $H_3PO_4$, of from about 103 to about 120 wt %. The polyphosphoric acid content can be calculated by mass flow measurement, titration, bubble tube or other acid strength measurement techniques.

Polyphosphoric acid stream 17 is cooled and may be further processed, such as, for example, filtered or diluted.

EXAMPLE

Polyphosphoric acid is made by the process of the present invention. The composition, relative flow rate (expressed in parts by weight (pbw)), temperature, specific gravity at operating temperature, and density of the acid feed stream 5, acid feed stream 9 and polyphosphoric acid stream 17 are shown in the TABLE.

TABLE

|  | Phosphoric Acid Feed Stream 5 | By-Product Acid Stream 9 | Polyphosphoric Acid Product Stream 17 |
|---|---|---|---|
| Flow rate (pbw) |  |  |  |
| $P_2O_5$ | 54.4 | 12.1 | 65.6 |
| Water | 45.6 | 7.2 | 10.8 |
| Methanol | 0 | 0.5 | 0 |
| Phosphate Esters | 0 | 2.4 | 0 |
| Total | 100 | 22 | 76.4 |
| Temperature (° F.) | 86 | 86 | 1040 |
| Specific Gravity at Operating Temperature | 1.56 | 1.5 | 2.1 |
| Density (lbs/ft3) | 98 | 98 | 107 |

The introduction of separate acid streams at the bottom and top of the packed column increases the capacity of packed column by allowing a higher throughput without flooding the packed column. Furthermore, introduction of the acid stream into hot air stream to form a stream of hot air and entrained acid allows the dehydration and polymerization of phosphoric acid into polyphosphoric acid to begin prior to its introduction into the packed column. In a preferred embodiment, the method of the present invention increases the capacity of the column 1 by 15 to 25%.

What is claimed is:

1. A method for making polyphosphoric acid from phosphoric acid, comprising:
    (a) providing a packed column, said packed column extending from a bottom end to a top end and having one or more first inlet openings located at or near the top end of the column and one or more second inlet openings located below the first inlet openings,
    (b) introducing a first acid feed stream, said first acid stream comprising phosphoric acid, into the column at one or more of the first inlet openings;
    (c) introducing a second acid feed stream, said second acid feed stream comprising phosphoric acid, into a stream of hot air to form a stream of hot air and acid;
    (d) introducing the stream of hot air and acid into the column at one or more of the second inlet openings; and
    (e) polymerizing phosphoric acid of the first and second acid feed streams to make polyphosphoric acid.

2. The method of claim 1, wherein the column comprises a substantially continuous tubular wall that extends longitudinally upwardly from the bottom end to the top end, a column height is defined by the distance from the bottom end of the column to the top end of the column and one or more of the first inlet openings are provided through the tubular wall and located within a distance equal to one half of the height of the column from the top end of the column.

3. The method of claim 1, wherein the column comprises a substantially continuous tubular wall that extends longitudinally upwardly from the bottom end to the top end, a column height is defined by the distance from the bottom end of the column to the top end of the column and one or more of the second inlet openings are provided through the tubular wall and located within a distance equal to one half of the height of packed column from the bottom end of the column.

4. The method of claim 1, wherein the column further comprises one or more outlet openings at or near the bottom end of the column, to allow removal of a material stream from the column.

5. The method of claim 1, wherein the column further comprises one or more outlet openings at or near the top end of the column to allow removal of a material steam from the column.

6. The method of claim 1, wherein the first acid feed stream comprises an aqueous phosphoric acid solution and said solution comprises from about 50 to about 90 percent by weight phosphoric acid.

7. The method of claim 1, wherein the second acid feed stream comprises an aqueous phosphoric acid solution and said solution comprises from about 50 to about 90 percent by weight phosphoric acid.

8. The method of claim 1, wherein the first acid feed stream is introduced to the column at a first flow rate, the second acid feed stream is introduced to the column at a second flow rate and the second flow rate is equal to from about 10% to about 50% of the first flow rate.

9. The method of claim 1, wherein the hot air stream exhibits a temperature of from about 800° C. to about 1200° C.

10. The method of claim 1, wherein the hot acid feed stream exhibits a temperature of from about 450° C. to about 750° C.

11. The method of claim 1, wherein a temperature above about 300° C. is maintained within the packed column.

12. The method of claim 1, wherein the polyphosphoric acid has an acid content, expressed on the basis of $H_3PO_4$, of from about 103 to about 120 percent by weight.

13. The method of claim 1, wherein, compared to operation of the column with a single acid feed stream, operation of the column according to the method increases the capacity of the column.

14. A method for consuming by-product phosphoric acid and reclaiming phosphorus values from the by-product phosphoric acid, said by-product phosphoric acid comprising phosphoric acid and one or more organic contaminants and said method comprising:
   (a) providing a packed column, said packed column extending from a bottom end to a top end and having one or more first inlet openings located at or near the top end of the column and one or more second inlet openings located below the first inlet openings;
   (b) introducing a first acid feed stream, said first acid feed stream comprising phosphoric acid, into the column at one or more of the first inlet openings;
   (c) introducing a second acid feed stream, said second acid feed stream comprising by-product phosphoric acid, into a stream of hot air to form a stream of hot air and acid;
   (d) introducing the stream of hot air and acid into the column at one or more of the second inlet openings; and
   (e) polymerizing phosphoric acid of the first and second feed streams to make polyphosphoric acid, while simultaneously decomposing the one or more organic contaminants.

15. The method of claim 14, wherein the by-product acid comprises approximately 75 percent by weight phosphoric acid and further comprises organic contaminants.

16. The method of claim 15, wherein the organic contaminants comprise one or more members selected from the group consisting of phosphate esters.

17. The method of claim 14, wherein the organic contaminants comprise one or more members selected from the group consisting of mono-, di- and tri-methyl phosphate esters, aniline, 4-chloroaniline, o-toluidine, p-toluidine, and methanol.

18. A method for making polyphosphoric acid from phosphoric acid, comprising:
   (a) providing a packed column having a top end and a bottom end;
   (b) introducing a first acid feed stream, said first acid stream comprising phosphoric acid, into the top end of the column;
   (c) introducing a second acid feed stream, said second acid feed stream comprising phosphoric acid, into a stream of hot air to form a stream of hot air and acid;
   (d) introducing the stream of hot air and acid into the bottom end of the column; and
   (e) polymerizing phosphoric acid of the first and second acid feed streams to make polyphosphoric acid.

19. A method for consuming by-product phosphoric acid and reclaiming phosphorus values from the by-product phosphoric acid, said by-product phosphoric acid comprising phosphoric acid and organic contaminants, comprising:
   (a) providing a packed column having a top end and a bottom end;
   (b) introducing a first acid feed stream, said first acid feed stream comprising phosphoric acid, into the top end of the column;
   (c) introducing a second acid feed stream, said second acid feed stream comprising by-product phosphoric acid, into a stream of hot air to form a stream of hot air and acid;
   (d) introducing the stream of hot air and acid into the bottom end of the column; and
   (e) polymerizing phosphoric acid of the first and second feed streams to make polyphosphoric acid, while simultaneously decomposing the organic contaminants.

* * * * *